(12) United States Patent
Ho et al.

(10) Patent No.: US 7,747,173 B1
(45) Date of Patent: Jun. 29, 2010

(54) MULTI-PHASE CLOCKING OF INTEGRATED CIRCUITS USING PHOTONICS

(75) Inventors: Ronald Ho, Mountain View, CA (US); John E. Cunningham, San Diego, CA (US); Ashok V. Krishnamoorthy, San Diego, CA (US); Robert J. Drost, Los Altos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 572 days.

(21) Appl. No.: 11/728,841

(22) Filed: Mar. 26, 2007

Related U.S. Application Data

(60) Provisional application No. 60/786,574, filed on Mar. 27, 2006.

(51) Int. Cl.
*H04B 10/00* (2006.01)

(52) U.S. Cl. .................. 398/154; 398/155; 398/159

(58) Field of Classification Search ............... 398/154, 398/155, 158, 159, 192
See application file for complete search history.

(56) References Cited

U.S. PATENT DOCUMENTS

| | | | |
|---|---|---|---|
| 6,239,892 B1 * | 5/2001 | Davidson | 398/154 |
| 6,570,694 B1 * | 5/2003 | Yegnanarayanan | 398/175 |
| 2004/0037559 A1 * | 2/2004 | Gunning | 398/70 |
| 2004/0132421 A1 * | 7/2004 | Underbrink | 455/255 |

* cited by examiner

*Primary Examiner*—M. R. Sedighian
(74) *Attorney, Agent, or Firm*—Park, Vaughan & Fleming LLP

(57) ABSTRACT

Embodiments of an integrated circuit are described. This integrated circuit includes a clock-generator circuit configured to provide a clock signal and an optical clock path coupled to the clock-generator circuit. Note that the optical clock path is configured to distribute optical signals corresponding to the clock signal. Furthermore, note that a given optical signal has a phase which is different than phases of the other optical signals.

19 Claims, 11 Drawing Sheets

MULTI-PHASE CLOCKING OF INTEGRATED CIRCUITS USING PHOTONICS

CROSS REFERENCE TO RELATED APPLICATIONS

This application claims priority under 35 U.S.C. section 119(e) to U.S. Provisional Application Ser. No. 60/786,574, filed on Mar. 27, 2006, the contents of which are herein incorporated by reference.

This application was filed by Park, Vaughan & Fleming LLP, 2820 Fifth Street, Davis, Calif. 95618, United States of America, (530) 759-1660.

BACKGROUND

1. Field of the Invention

The present invention relates to techniques for communicating signals. More specifically, the present invention relates to using on-chip photonics to distribute and to adjust the skew or phase of clock signals.

2. Related Art

Many high-performance circuits or integrated circuits are clocked by a periodic clock signal to coordinate operations between circuits elements. For example, a microprocessor may run at 2 GHz based on clock signals that have a clock period of 500 ps. In these circuits, it is often necessary to distribute the clock signal such that it reaches all of the targeted circuit elements at the same time (which is sometimes referred to as equal clocking). A variety of existing circuit geometries have been used to achieve this goal, including: H-trees, grids, and/or spines. Unfortunately, even with these circuit geometries, it is difficult if not impossible to achieve equal clocking because of effects such as clock skew and clock jitter.

As shown in FIG. 1, which provides an illustration of existing clock signals 110, clock skew 118 refers to a variation in the arrival time of edges 114 and 116 in clock signal 110-2. This variation is typically systematic and is usually time invariant. In contrast, variations in the arrival time of edges 114 in the clock signals 110 during successive clock cycles are called clock jitter 112. In general, clock jitter 112 includes deterministic and random (or at least uncorrelated) components. Consequently, each version of a clock signal that is distributed to different portions of a circuit typically includes so-called 'differential jitter.'

Clock skew 118 typically results from the imperfect matching of different clock paths. As shown in FIG. 2A, which provides a block diagram illustrating a semiconductor die 210, a signal line 214-1 that routes clock signals from a central clock circuit 212 (which typically includes a phase-locked loop) to a first target portion of the semiconductor die 210 (such as a circuit 216-1) may have a slightly different length or width than those of signal line 214-2 that routes the clock signals to a second target portion (such as circuit 216-2). This difference may be the result of a design error or a processing inaccuracy. For example, one of the signal lines 214 may have more sidewall capacitance than the other, which results in both static and dynamic differences in capacitance between the two signal lines 214.

A typical design constraint for clock jitter 112 (FIG. 1) is approximately 5% of the delay associated with the entire clock path (which is sometimes referred to as the 'insertion' delay) or 10% of the clock period. (Note that design constraints are even more stringent in circuits that include multiple clock signals, such as multi-phased clock signals.) However, it is often difficult to reduce or eliminate clock skew 118 (FIG. 1) because mismatches between clock paths rarely arise until after a layout is completed and the performance of the design is extracted using simulations. Unfortunately, the extraction process is complicated and has limited accuracy.

Clock jitter 112 (FIG. 1) has a variety of sources, including power-supply noise and crosstalk (for example, between adjacent signal lines). For example, as power-supply voltages rise and fall the delays associated with elements along clock paths will also vary. These variations in the clock-path delay can lead to cycle-to-cycle differences in the arrival times of clock edges (such as clock edges 114 in FIG. 1). Note that a design constraint for clock jitter 112 (FIG. 1) is typically approximately 5% of the clock period. Unfortunately, aside from decreasing the overall insertion delay, further reducing or avoiding clock jitter 112 (FIG. 1) is difficult.

Furthermore, distributing clock signals also consumes power. For example, distributing clock signals in existing high-performance microprocessors may consume up to 20% of the total chip power. As clock frequencies continue to increase, this power consumption is becoming an increasing burden and is creating challenges for circuit designers.

Moreover, many systems benefit from using multi-phase clock signals for circuits such as oversampled receivers. These multi-phase clock signals are either generated at the receivers (at high area and power cost) or are distributed from a central clock source (with the associated clock skew and jitter problems discussed above).

Hence, what is needed is a method and an apparatus that facilitates distribution of clock signals without the problems listed above.

SUMMARY

One embodiment of the present invention provides an integrated circuit, which includes: a clock-generator circuit configured to provide a clock signal; an optical clock path coupled to the clock-generator circuit; and a latch coupled to the optical clock path. This optical clock path is configured to distribute an optical signal corresponding to the clock signal. Furthermore, the optical clock path is configured to optically set a skew value for the optical signal, and is configured to selectively gate distribution of the optical signal to the latch based on activity of the latch. Note that the selective gating is performed optically.

In some embodiments, while setting the skew value the optical clock path is configured to dynamically adjust the skew value. Furthermore, in some embodiments the optical clock path is configured to dynamically adjust the skew value based on activity of the integrated circuit and/or based on a level of a power-supply signal on the integrated circuit.

In some embodiments, the optical clock path includes an optical waveguide.

In some embodiments, the optical clock path is configured to set the skew value by modifying an index of refraction in the optical clock path. For example, the optical clock path may be configured to electrically modify the index of refraction by changing a number of charge carriers in the optical clock path, thereby changing a delay of the optical clock path.

In some embodiments, the optical clock path is configured to set the skew value by passing the optical signal through a resonant cavity that provides a known amount of additional path delay.

In some embodiments, the optical clock path is configured to selectively gate distribution of the optical signal using: an interferometer, an electronically controllable diffraction grating, and/or evanescent coupling between the optical clock path and a ring resonator. Note that the ring resonator may be configured to be electrically tuned. For example, the electrical tuning of the ring resonator may change a number of charge carriers in the ring resonator, thereby changing a resonance frequency of the ring resonator. Moreover, in some embodiments the integrated circuit includes a temperature controller that is configured to maintain a temperature of the interferometer, the diffraction grating, and/or the ring resonator.

In some embodiments, the skew value is non-zero.

In some embodiments, the integrated circuit includes a first conversion element that is configured to convert the clock signal into the optical signal and/or a second conversion element that is configured to convert the optical signal into an electrical signal. Note that the second conversion occurs prior to the latch.

In some embodiments, the latch includes an optical latch.

Another embodiment of the present invention provides a computer system that includes the integrated circuit.

Another embodiment of the present invention provides a method for providing a clock signal on an integrated circuit. During this method, clock signals are generated. Then, an optical signal corresponding to the clock signal is distributed to a latch using an optical clock path on the integrated circuit. Next, a skew value for the optical signal is optically set during the distribution, and distribution of the optical signal to the latch is selectively gated based on activity of the latch. Note that the selective gating is performed optically.

Another embodiment of the present invention provides a second integrated circuit, which includes a clock-generator circuit configured to provide a clock signal and an optical clock path coupled to the clock-generator circuit. Note that the optical clock path is configured to distribute optical signals corresponding to the clock signal. Furthermore, note that a given optical signal in the optical signals has a given phase which is different than phases of the other optical signals.

In some embodiments, the second integrated circuit includes one or more receivers (such as a group of receivers) coupled to the optical clock path. Note that the optical signals facilitate oversampling of signals at the one or more receivers. For example, a given receiver in the group of receiver may be configured to be triggered using one or more of the optical signals. In some embodiments, the second integrated circuit includes a multiplexer between the optical clock path and the one or more receivers.

In some embodiments, the optical signals are encoded using wavelength-division multiplexing. Moreover, in some embodiments the optical signals are encoded using time-division multiple access, frequency-division multiple access, and/or code-division multiple access.

In some embodiments, the clock generator is configured to provide multiple phases of the clock signal.

In some embodiments, the optical clock path is configured to generate the optical signals from the clock signal.

In some embodiments, the second integrated circuit includes a conversion element coupled to the optical clock path. This conversion element may be configured to convert the optical signals into electrical signals.

Another embodiment of the present invention provides a third integrated circuit. This third integrated circuit includes a clock-generator circuit configured to provide optical clock signals and an optical clock path coupled to the clock-generator circuit. Note that a given optical clock signal in the optical clock signals has a given phase which is different than phases of the other optical signals. Furthermore, note that the optical clock path is configured to distribute the optical clock signals.

Another embodiment of the present invention provides a computer system that includes the second integrated circuit and/or the third integrated circuit.

Another embodiment of the present invention provides a method for providing multiple clock signals on a fourth integrated circuit. During this method, a clock signal is generated. Then, optical signals corresponding to the clock signal are distributed using an optical clock path on the fourth integrated circuit. Note that a given optical signal has a phase which is different than phases of the other optical signals.

BRIEF DESCRIPTION OF THE FIGURES

Note that like reference numerals refer to corresponding parts throughout the drawings.

DETAILED DESCRIPTION

Figure 1:
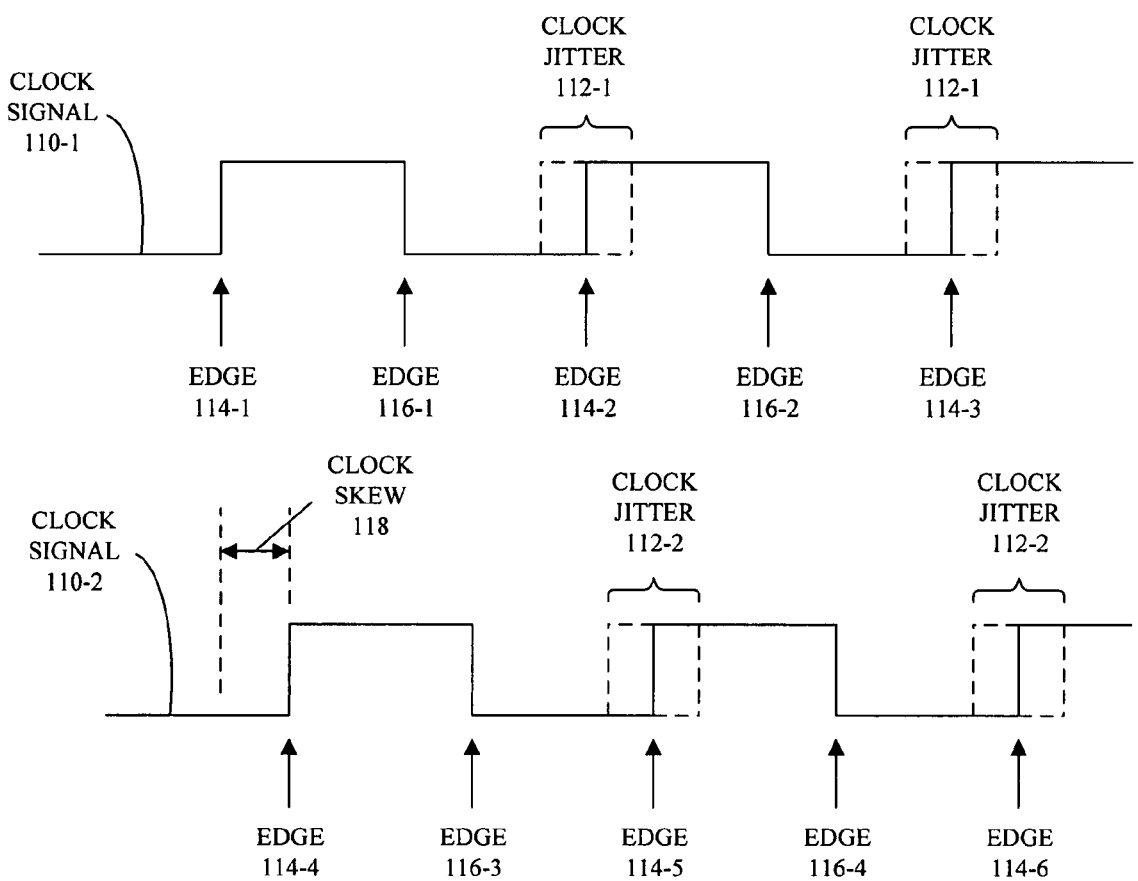
FIG. 1 is a diagram illustrating existing clock signals.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a method, a circuit, an integrated circuit, a semiconductor die that includes the integrated circuit, and a system that includes the semiconductor die are described. This integrated circuit is configured to distribute one or more clock signals to one or more circuits or components (such as an electronic latch and/or an optical latch) in the integrated circuit (which are sometimes referred to as clock targets). During distribution, one or more optical signals corresponding to the one or more clock signals are communicated using an optical clock path (for example, via an optical waveguide). Furthermore, during distribution the integrated circuit is configured to optically set skew values and/or to selectively gate the one or more optical signals (for example, based on activity of the one or more circuits or components). Note that the skew value may be non-zero, i.e., intentional skew may be used.

In some embodiments, the optical clock path is configured to dynamically adjust the skew value. For example, the skew value may be dynamically adjusted based on activity of the integrated circuit and/or based on a level of a power-supply signal on the integrated circuit. In addition, a wide variety of techniques may be used to set the skew value, including electrically modifying an index of refraction in the optical clock path. And in some embodiments the selective gating uses: an interferometer, an electronically controllable diffraction grating, and/or evanescent coupling between the optical clock path and a ring resonator.

Note that the integrated circuit may include an electrical-to-optical (EO) conversion element and/or an optical-to-electrical (OE) conversion element. For example, the one or more clock signals may be converted to the one or more optical signals using one or more EO conversion elements, and/or the one or more optical signals may be converted to one or more electrical signals prior to the circuit or the component using one or more OE conversion elements.

Furthermore, in some embodiments the optical clock path distributes multiple optical signals, each of which has a different phase than the other optical signals. These optical signals may be generated at a source and/or during distribution via the optical clock path. In addition, the optical signals may be selectively coupled (for example, using a multiplexer) to a set of receivers, thereby facilitating oversampling of signals. Note that the optical signals may be encoded using: time-division multiple access, frequency-division multiple access, and/or code-division multiple access. For example, the optical signals may be encoded using wavelength-division multiplexing (WDM), such as dense wave-division multiplexing.

In some embodiments, the semiconductor die is included in a so-called 'macro chip,' which includes multiple semiconductor dies that communicate with each other using proximity communication. For example, the semiconductor dies may communicate electrical signals using capacitively coupled proximity connectors that are on or proximate to surfaces of the semiconductor dies (which is referred to as capacitively coupled proximity communication). In another example, the semiconductor dies may communicate optical signals using optically coupled proximity connectors that are on or proximate to surfaces of the semiconductor dies (which is referred to as optical proximity communication).

Embodiments of the integrated circuit may be used in a variety of applications, including: telephony, communications, storage area networks, data centers, networks (such as local area networks), and/or computer systems (including multi-processor computer systems). For example, a macro-chip that includes semiconductor dies may be configured as a switch.

We now describe embodiments of the integrated circuit and the semiconductor die. As discussed previously, equal clocking in devices and systems that include distributed clock signals may be difficult because of effects such as clock skew and clock jitter. From a design perspective, these effects can be addressed by keeping the clock skew and clock jitter know (for example, bounded) and/or by using various reduction or mitigation techniques. However, these reduction techniques are often difficult and expensive. In addition, in many circuits or integrated circuits it is advantageous to: adjust the skew value; to gate one or more clock signals; and/or to provide multi-phased clock signals. These additional features may add to the complexity and expense of the circuits or integrated circuits.

In many systems, a zero skew at all clock targets in an integrated circuit may not be desirable. For example, on a given chip some logical paths are inherently slower than others, but because of hierarchy and complexity issues, all of the logical paths are given equal time to complete a set of operations. Unfortunately, in some cases an inherently slower logical path directly precedes an inherently faster one. Here, a slightly delay in the clock signal at the end of the first (slower) logical path may be preferable. However, in other examples an inherently faster logical path precedes an inherently slower one, in which case it may be preferable to slightly speed up the clock signal at the end of the first logical path.

Figure 2A:
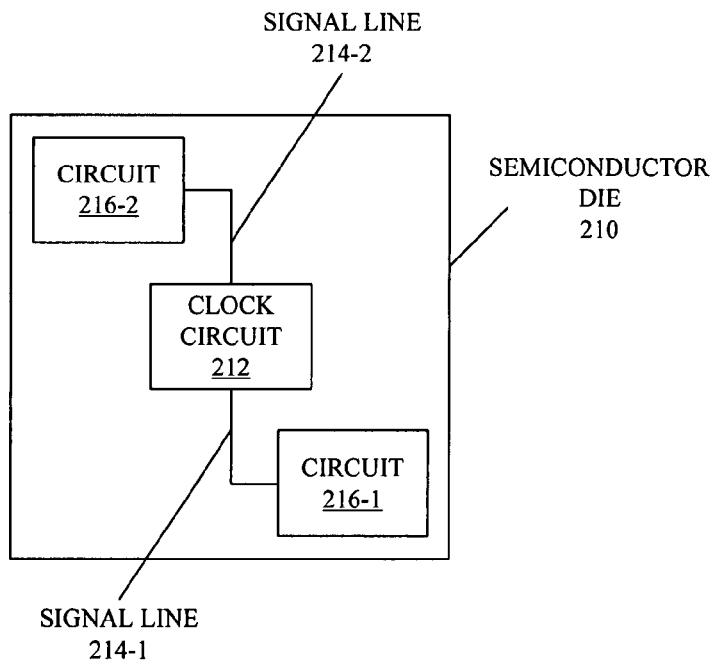
FIG. 2A is a block diagram illustrating an existing semiconductor die.
Figure 2B:
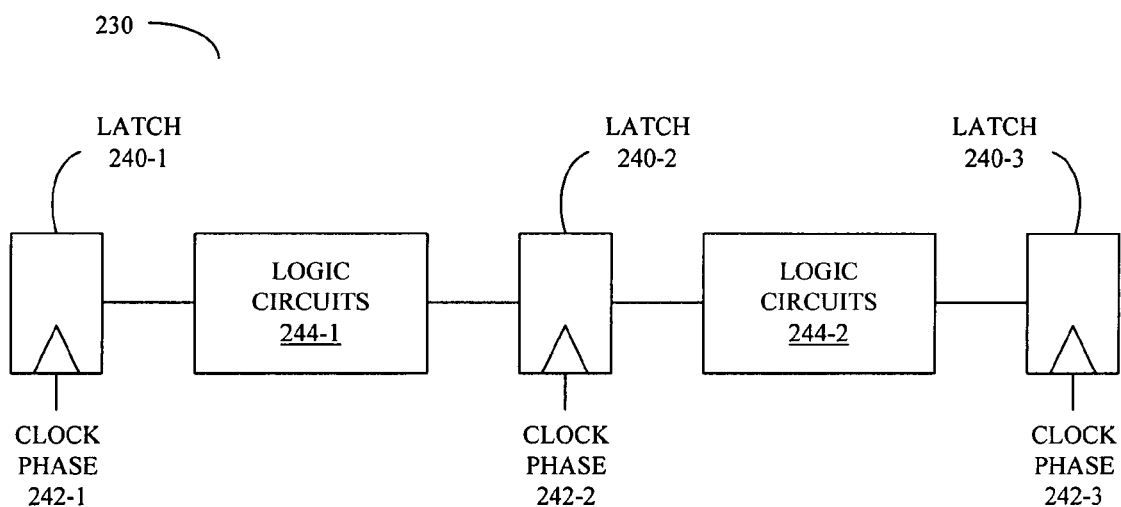
FIG. 2B is a block diagram illustrating an existing clock distribution circuit.

As shown in FIG. 2B, which presents a block diagram of an existing clock distribution circuit, intentional skewing of signals in a logical path 230 may be performed using what are known as 'clock deskew buffers.' In particular, in logic path 230 phases of clock signals 242 may be adjusted to vary the timing of signal latching by latches 240, thereby delaying (or advancing) processing of the signals in one or more of the logic circuits 244. For example, if a processing time of logic circuit 244-1 is greater than the clock period and a processing time of logic circuit 244-2 is less than the clock period, phase 242-2 may be adjusted to be later than it would be if the processing times of the logic circuits 244 were the same. Note that the granularity of the skew adjustment determines the power consumption and the area of such clock deskew buffers, with more adjustment capability leading to greater power consumption and area overhead. In existing clock deskew buffers, the adjustment granularity is approximately a quarter of a gate delay.

Another way to increase the skew or the optical delay experienced by an optical signal while traversing an optical waveguide is to introduce a high-Q resonator into the path or couple the optical signal into a high-Q resonant cavity. This increases the delay of the optical signal by the delay experienced by said optical signal while resident in the resonator. A number of resonators of different cavity Qs (or different photon lifetimes) can be used to create a digitally controlled tapped delay line. This may have improved dynamic range than using the refractive index change (although the latter may provide finer control). A combination of both techniques may be advantageous.

Furthermore, power dissipation in many existing integrated circuits (such as modern microprocessors) is often controlled by gating of clock signals. In particular, a clock signal to a given clock target (such as functional block) may be blocked or disabled until circuits in the clock target are activated. For example, a logical AND operation may be performed using the given clock signal and a control signal, which is used to activate or deactivate a functional block. Note that such clock-gating circuits are often combined with clock deskew circuits. In addition, the power consumption and area of the clock-gating circuits increases with the granularity of the clock gating. At one extreme, a clock signal may be distributed using a so-called binary H-tree which can gate half of a microprocessor using only a single clock-gating circuit. While, this design consumes little power and area, it offers very limited functionality. At the other extreme, it is possible to clock-gate every single flop in a microprocessor to provide the finest possible control over power consumption. However, this approach may use upwards of hundreds of thousands of clock-gating circuits, each of which having an associated area and consume additional power. In general, designs between these extrema are often used.

Typically, clock signals in existing high-performance microprocessors consume between 25% and 70% of the total chip power consumption. Note that the majority (70% to 80%) of this power consumption occurs at the clock targets or functional blocks at the end of the global clock distribution circuits. Consequently, global distribution of the clock signals consumes 20% to 30% of the clock power consumption, or anywhere from 5% to 20% of the total chip power consumption.

Figure 3A:
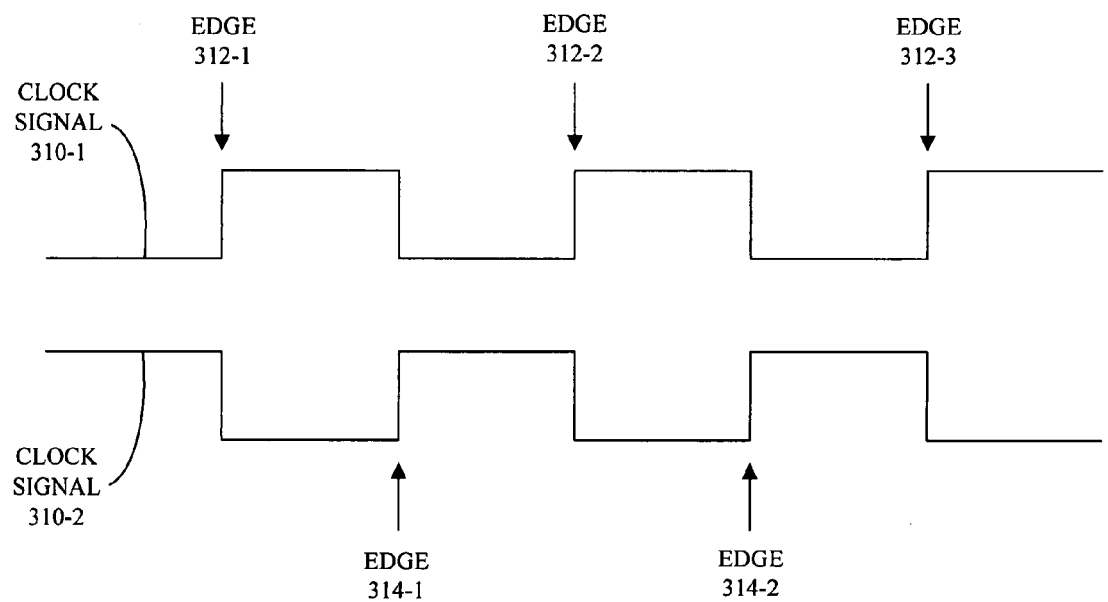
FIG. 3A is a diagram illustrating existing clock signals.

In addition to these approaches for adjusting skew values and/or for gating one or more clock signals, some integrated circuits use both a (periodic) clock signal and a delayed version of it as well. A typical example is a so-called 'domino circuit,' which can be thought of as evaluating upon the arrival of the clock signal, and resetting upon arrival of a delayed version of this clock signal. As shown in FIG. 3A, which presents a diagram illustrating existing clock signals, many domino circuits use two clock signals 310, where one of the clock signals 310 is delayed by one-half of the clock period (which we refer to as a '180° delay,' where a full clock period corresponds to a phase of 360°). Note that the domino circuits may evaluate at edges 312 and may reset at edges 314 in the clock signals 310. Furthermore, because a 180°-delayed clock signal is simply the inverse of the other clock signal, these clock signals may be generated using conventional electrical circuits and may be distributed using a single wire or signal line. However, this approach places constraints on the duty cycle of the clock signals 310 because a skewed duty cycle results in unequal phase times.

Figure 3B:
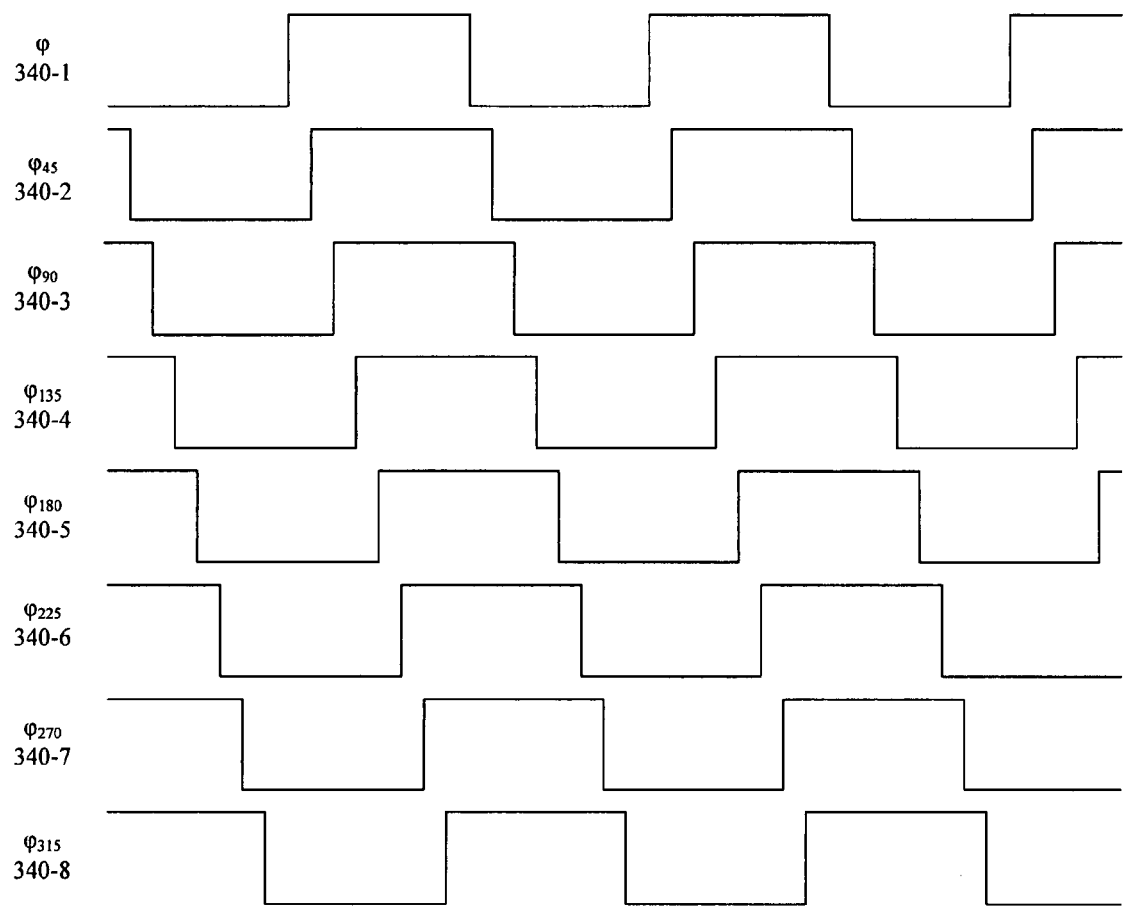
FIG. 3B is a diagram illustrating existing clock signals.
Figure 4:
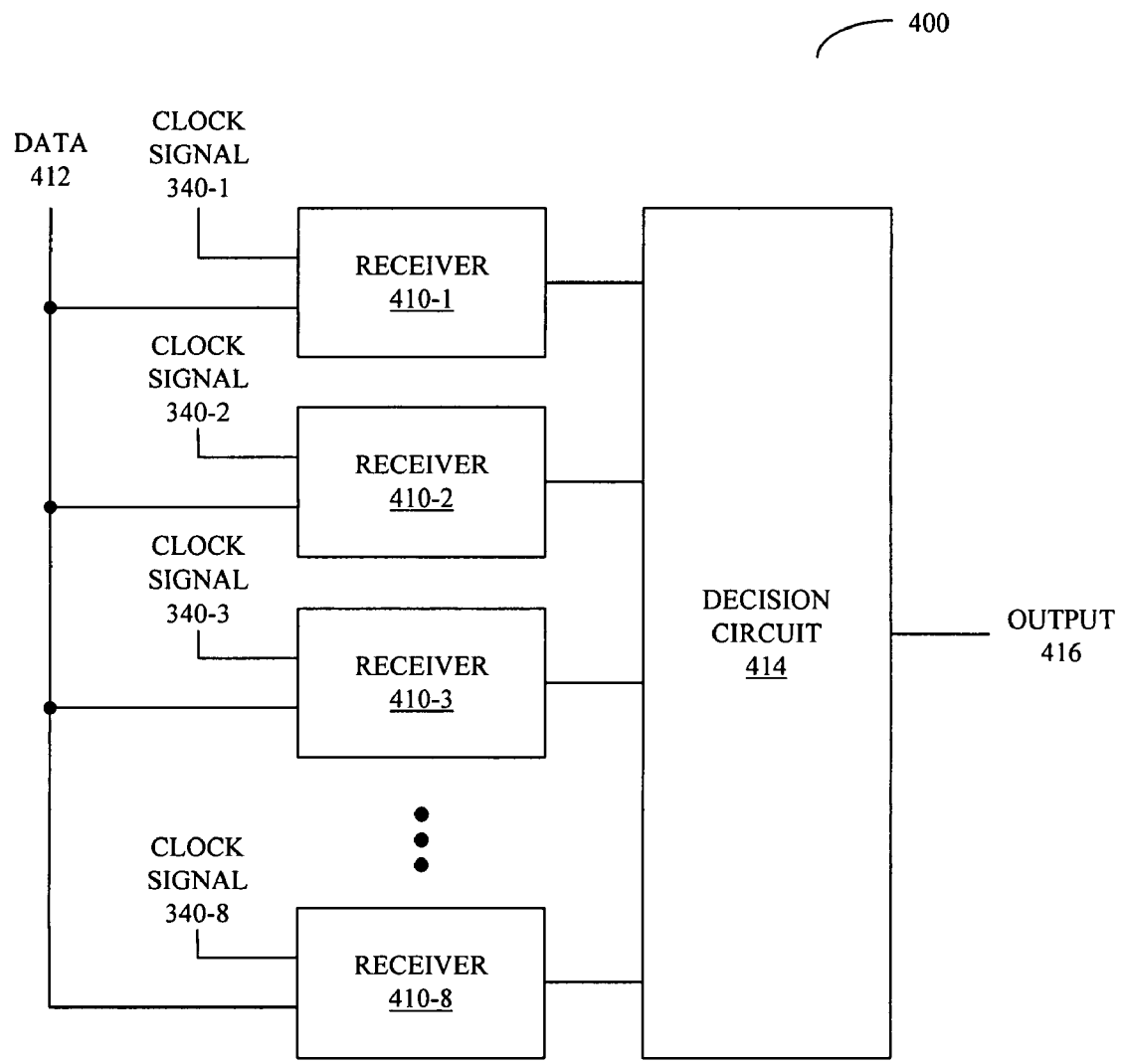
FIG. 4 is a block diagram illustrating a receiver circuit in accordance with an embodiment of the present invention.

Many integrated circuits use even more complicated clock signals, such as multi-phase clock signals. These integrated circuits may include: skew-tolerant domino circuits (with 4 or 5 clock-signal sub-phases), output-prediction logic circuits, power supply-monitor sampling circuits, and/or serial links that use an array of parallel circuits (for example, a 10 Gbps link that is oversampled to match a data rate to the clock period). For example, an oversampling receiver in a serial chip-to-chip link may use eight clock signals, where all eight of the clock signals are equally spaced over the period (i.e., these clock signals have different phases spaced approximately every 45°). FIG. 3B presents a diagram illustrating existing clock signals 340. As shown in FIG. 4, which presents a block diagram illustrating an embodiment of a receiver circuit 400, the clock signals 340 may be used to trigger sampling of a bit in data 410 by a set of eight receivers 412 at eight sampling points within a clock period. Then, outputs from the receivers 412 may be combined using a decision circuit 414 to generate a received bit in output 416 (for example, by interpolating between the phase samples).

As discussed previously and illustrated in FIG. 2A, global distribution of a clock signal from a central clock circuit 212 (such as a phase-locked loop) may be difficult because of power consumption and skew problems. However, distributing a set of eight (or more) clock signals may be even harder. In particular, these additional clock signals require more design time and silicon area, and use more wires or signal lines and consume more power. Furthermore, timing mismatches may occur between these clock signals. In general, these timing mismatches include offsets (or skews) between the clock signals as well as cycle-to-cycle variations within a given clock signal (i.e., jitter). Note that imperfectly spaced clock signals may directly reduce the effectiveness of the integrated circuit. In addition, including separate clock circuits (such as clock circuit 212) at each receiver (such as the receivers 412 in FIG. 4) in an integrated circuit may be prohibitively expensive.

Note that the problem of timing mismatches between multi-phased clock signals is more challenging than the problem of skew in a single global clock distribution circuit. While both of these effects may arise from clock-path imbalances, designers may tolerate a global skew of 10% of the clock period. In contrast, 10% of the clock period is the nominal separation between ten multi-phase clock signals and a tolerance on this order is unacceptable. Consequently, the constraints on timing mismatch (a generalized form of skew) in multi-phase clock signals are much tighter than they are for single clock signals. Furthermore, distributing, controlling, and/or adjusting multi-phase clock signals using electrical signals may be expensive in terms of area, power consumption, and design complexity.

In the discussion that follows, photonic clock distribution is used to reduce clock skew and clock jitter, and/or to provide multiple clock phases. Furthermore, in some embodiments optical clock distribution circuits are used to adjust the skew value and/or to gate one or more clock signals.

Figure 5A:
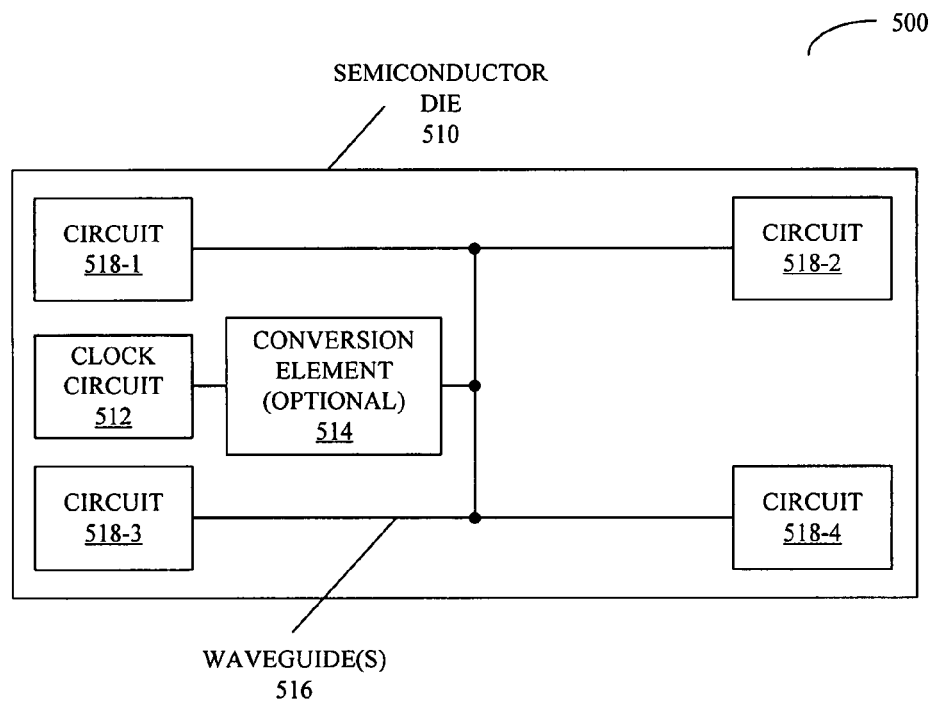
FIG. 5A is a block diagram illustrating a clocking system in accordance with an embodiment of the present invention.

FIG. 5A presents a block diagram illustrating an embodiment of a clocking system 500. In this system, a semiconductor die 510 includes a clock circuit 512 (such as a crystal oscillator coupled to a phase-locked loop and/or a delay-locked loop), which provides one or more clock signals. In some embodiments, optional conversion element 514 (such as a laser and/or a modulator) converts the one or more clock signals in to one or more optical signals. However, in other embodiments the clock circuit 512 provides the one or more optical signals. For example, the clock circuit 512 may include an optical source (such as a laser) and/or the one or more clock signals may be optical signals.

The one or more optical signals may be distributed to circuits 518 using one or more optical clock paths. Note that the one or more optical clock paths may include one or more waveguides 516, and the optional conversion element 514 may, at least in part, be included in the one or more waveguides 516. These waveguides may include: optical fibers, free space, and/or on-chip structures. For example, the one or more waveguides 516 may be silicon-on-insulator waveguides. Furthermore, in some embodiments the waveguides 516 and/or the semiconductor die 510 may include: a ring resonator, a modulator (such as a phase modulator), a detector, and/or an add or drop waveguide that configure input/output ports on the given component (for example, using splitters, grating couplers, and/or combiners).

In an exemplary embodiment, the one or more optical signals are distributed using: an H-tree, a grid, and/or a spine. Furthermore, in some embodiments the semiconductor die 510 includes another conversion element (not shown) prior to at least one of the circuits 518. This other conversion element may convert the one or more optical signals to one or more electrical signals that are used to clock at least one of the circuits 518 (for example, one of the circuits 518 may include a latch). However, in other embodiments at least one of the circuits 518 includes an optical latch, i.e., one or more of the optical signals may directly clock the optical latch without prior conversion to the one or more electrical signals.

Note that the one or more optical clock paths, such as the one or more waveguides 516, facilitate a static or steady-state reduction of clock skew and clock jitter. In particular, clock skew may be controlled precisely by mechanically trimming the waveguides 516 to match in path lengths and characteristics, and clock jitter is minimal because the insertion delay is significantly shorter and because linear optics do not suffer from crosstalk or electrical power supply variations. In addition, such photonic clocking reduces the power consumption of the chip by 5-10%. As discussed further below, in some embodiments photonic clocking also facilitates adjustment or dynamic adjustment of one or more skew values (including the use of intentional skew) and/or gating of one or more clock signals. These features may also be implemented with reduced expense.

Although the clocking system 500 is illustrated as having a number of discrete items, FIG. 5A and the other embodiments described below are intended to be a functional description of the various features which may be present rather than as a structural schematic of the embodiments described herein. In practice, and as recognized by those of ordinary skill in the art, the functions of the clocking system 500 (as well as the other embodiments) may be distributed over a large number of components performing particular subsets of functions. Therefore, the clocking system 500 (as well as the other embodiments) may include fewer components or additional components, two or more components may be combined into a single component, and/or a position of one or more components may be changed. For example, components may be implemented to operate on signals in the optical domain and/or in the electrical domain. Furthermore, in some embodiments functions of the clocking system 500 (as well as the other embodiments) may be implemented in hardware and/or in software. Note that in some embodiments photonic clock distribution is extended to distributing one or more clock signals to a collection of semiconductor dies (such as in a macro-chip), thereby enabling a low-skew phase relationship between these components.

Figure 5B:
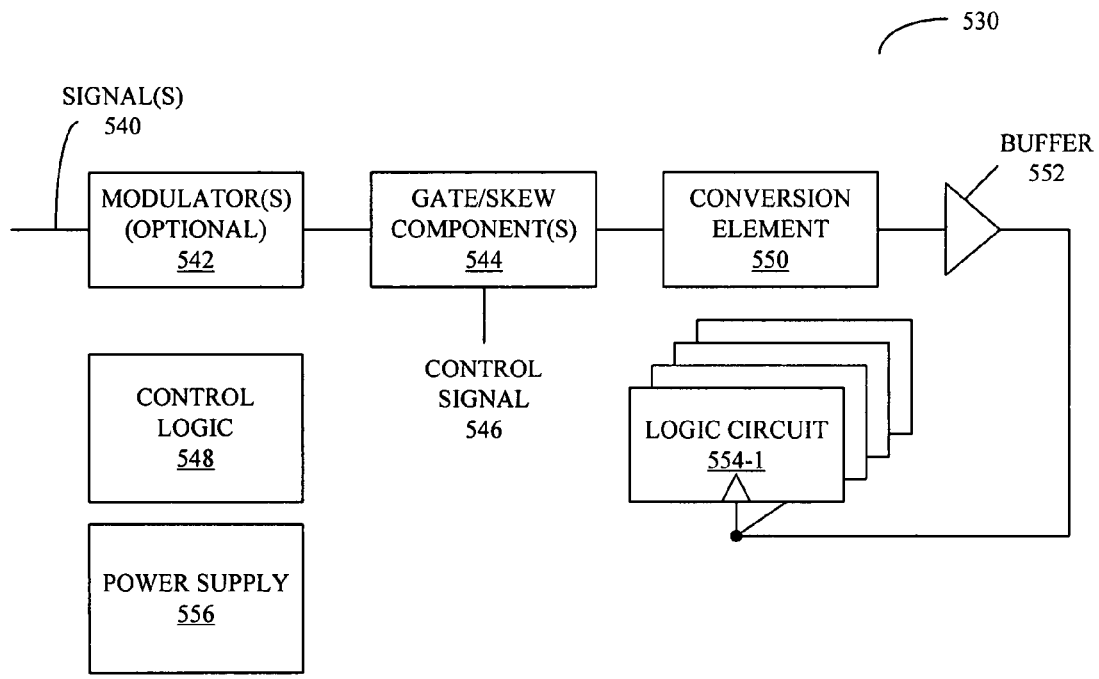
FIG. 5B is a block diagram illustrating a clock path in accordance with an embodiment of the present invention.

FIG. 5B presents a block diagram illustrating an embodiment of a clock path 530. In this path, one or more signals 540 (which may be electrical or optical signals) are received. Then, the one or more signals 540 are optionally modulated using one or more modulator 542. For example, the one or more modulators 542 may convert one or more clock signals into one or more optical signals. Concurrently or independently, the one or more modulators 542 may encode the optical signals using an encoding technique, including: time-division multiple access, frequency-division multiple access, and/or code-division multiple access. For example, the optical signals may be encoded using wave-division multiplexing (WDM), such as dense wave-division multiplexing.

Furthermore, one or more gate/skew components 544 may be used to set, change, modify, and/or adjust at least one skew value of the one or more of the optical signals based on a control signal 546 provided by control logic 548. In some embodiments, the one or more gate/skew components 544 dynamically adjust at least the one skew value and/or set an intentional skew value. Note that the one or more gate/skew components 544 (as well as other components in the clock path 530) may be implemented, at least in part, using one or more waveguides (such as the waveguides 516 in FIG. 5A).

In some embodiments, the one or more optical signals are converted into electrical signals by a conversion element 550 and coupled to one or more logic circuits 554 using a buffer 552. However, in other embodiments the one or more optical signals directly clock at least one of the logic circuits 554 (for example, one or more of the logic circuits 554 may include an optical latch). Note that the (dynamic) adjustment may be performed continuously or during a calibration mode of operation (such as after a minimum elapsed time since a previous calibration or as need based on a performance metric of one or more of the logic circuits 554).

Note that the one or more gate/skew components 544 may include one or more modulators to adjust at least one skew value. These modulators may include one or more pn junctions, which may be used to modify an index of refraction in the clock path 530. For example, the one or more p-n junctions may change a number of charge carriers in a waveguide, thereby changing a delay of the waveguide. This change in the number of charge carriers (either minority carriers and/or majority carriers) may be based on a voltage (such as the control signal 546) and/or a temperature (which may be set, adjusted, and/or regulated using a temperature controller).

Thus, the one or more gate/skew components 544 may enable adjustment of clock skew, even on an individual clock-path basis. Furthermore, the one or more gate/skew components 544 may facilitate the use of intentional skew in conjunction with photonic clocking to compensate for effects including: different logical-path delays; to adjust for imperfect local clock circuits; and/or to facilitate test and debug of circuits.

In an exemplary embodiment, silicon waveguides (such as those based on silicon-on-insulator technology) provide a class of optical devices that enable variable alignment of a clock signal relative to a reference signal. For example, let a clock signal split at a Y coupler (or branch point in an H-tree clock-distribution network) into separate waveguides branches, one of which contains an electrical junction (p-n junction) and the other does not. Thus, one or the waveguides has an electronically controlled index of refraction. Note that junctions in waveguides are typical semiconductor junctions created in numerous ways, such as using metal gates, or p-type and/or n-type doping. Furthermore, the function of the junction is to inject carriers into the optical path.

When an optical signal (such as a clock pulse) travels in a waveguide branch that has a different carrier population because of a p-n junction, it propagates at a slower speed (and thus has a delay or skew value relative to the optical signal in the other branch). By electrically biasing the p-n junction, it is possible to delay one of the optical signals by as much as 180°, if the waveguide is sufficiently long. (Note that the voltage that produces a 180° delay or phase shift is called Vp, and that application of a voltage up to Vp produces a variable phase shift of the two optical signals.) Thus, this approach effectively creates a small, practical delay line using a waveguide and an electrical junction. (As discussed further below with reference to FIG. 6A, this approach may also be used in an interference device to gate one or more of the optical signals.)

In some embodiments, the one or more gate/skew components 544 and the control logic 548 are included in a feedback loop. This feedback loop may be used to dynamically adjust at least one skew value based on activity of one or more of the logic circuits 554 and/or based on a level of a power-supply signal provided by power supply 556. For example, if an integrated circuit stops performing a floating-point calculation, a power-supply voltage may increase and one or more of the logic circuits 554 may speed up. In this case, a timing constraint may be relaxed and a skew value set by the one or more gate/skew components 544 may be relaxed.

Figure 6A:
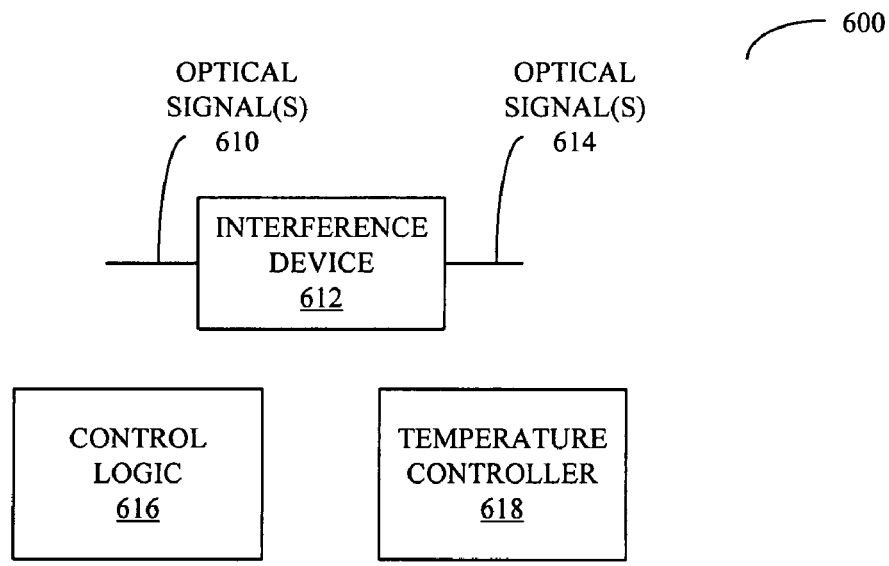
FIG. 6A is a block diagram illustrating a gating device in accordance with an embodiment of the present invention.
Figure 6B:
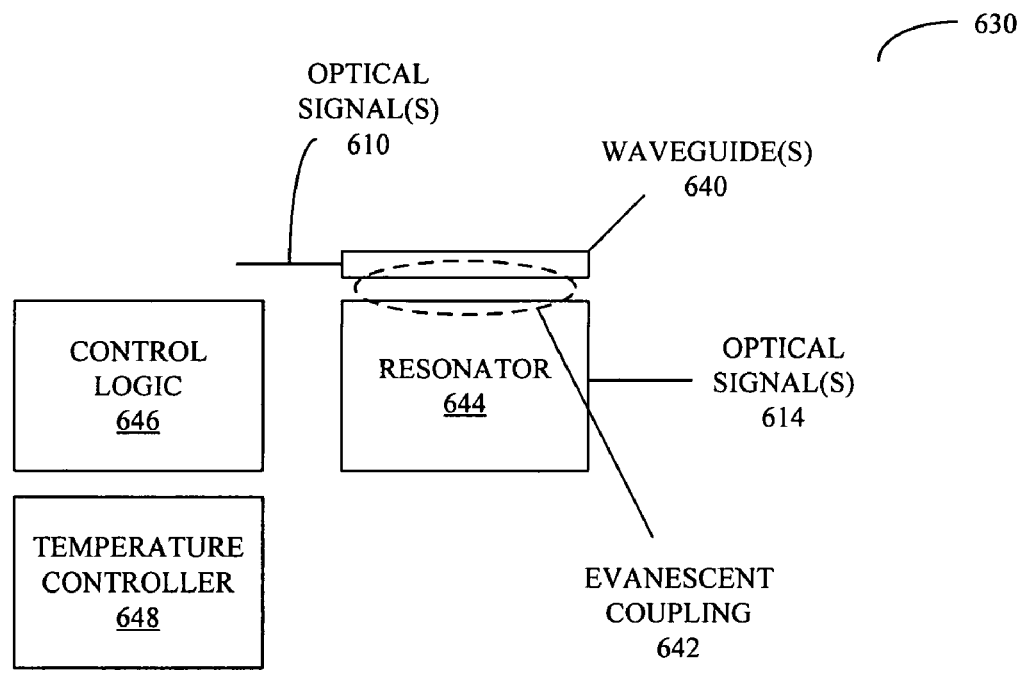
FIG. 6B is a block diagram illustrating a gating device in accordance with an embodiment of the present invention.

It is also possible to gate one or more of the optical signals using the one or more gate/skew components 544, thereby selectively suppressing one or more of the clock signals and reducing power consumption in an integrated circuit. This is shown in FIGS. 6A and 6B, which present block diagrams illustrating embodiments of gating devices 600 and 630. In gating device 600, an interference device 612 (such as an electronically controlled diffraction grating or an interferometer) is used to selectively gate one or more optical signals 610 (i.e., to enable or disable one or more optical signals 614) based signals from control logic 616. In some embodiments, a temperature controller 618 is used to regulate or control a temperature of the interference device 612 via heating and/or cooling components (not shown).

In an exemplary embodiment, the interference device 612 includes a Mach-Zehnder interferometer (MZI), where a phase difference or delay is applied to optical signals in one of two optical paths (for example, using a p-n junction). When the resulting optical signals are combined, destructive interference may occur thereby gating an optical signal.

In gating device 630, optical signals in one or more waveguides 640 are evanescently coupled 642 to a resonator 644 (such as an electrically or thermally controlled ring resonator). By varying a control voltage provided by control logic 646 or a temperature set or regulated by temperature controller 648, a resonance frequency of the resonator 644 may be adjusted. In particular, a number of charge carriers in the resonator 644 may be changed by injecting sufficiently high power to an input port of the resonator 644, thereby detuning the resonator 644 such that the one or more optical signals 614 are not output from the resonator 644. Thus, how energy is transferred from the one or more waveguides 640 to the resonator 644 may be controlled (for example, energy at the resonance frequency will be transferred), thereby gating the one or more optical signals 610, i.e., enabling or disabling the one or more optical signals 614. Note that this approach may facilitate gating of optical signals (and thus gating of clock signals) at the start, middle, or end of a clock distribution tree.

Figure 7:
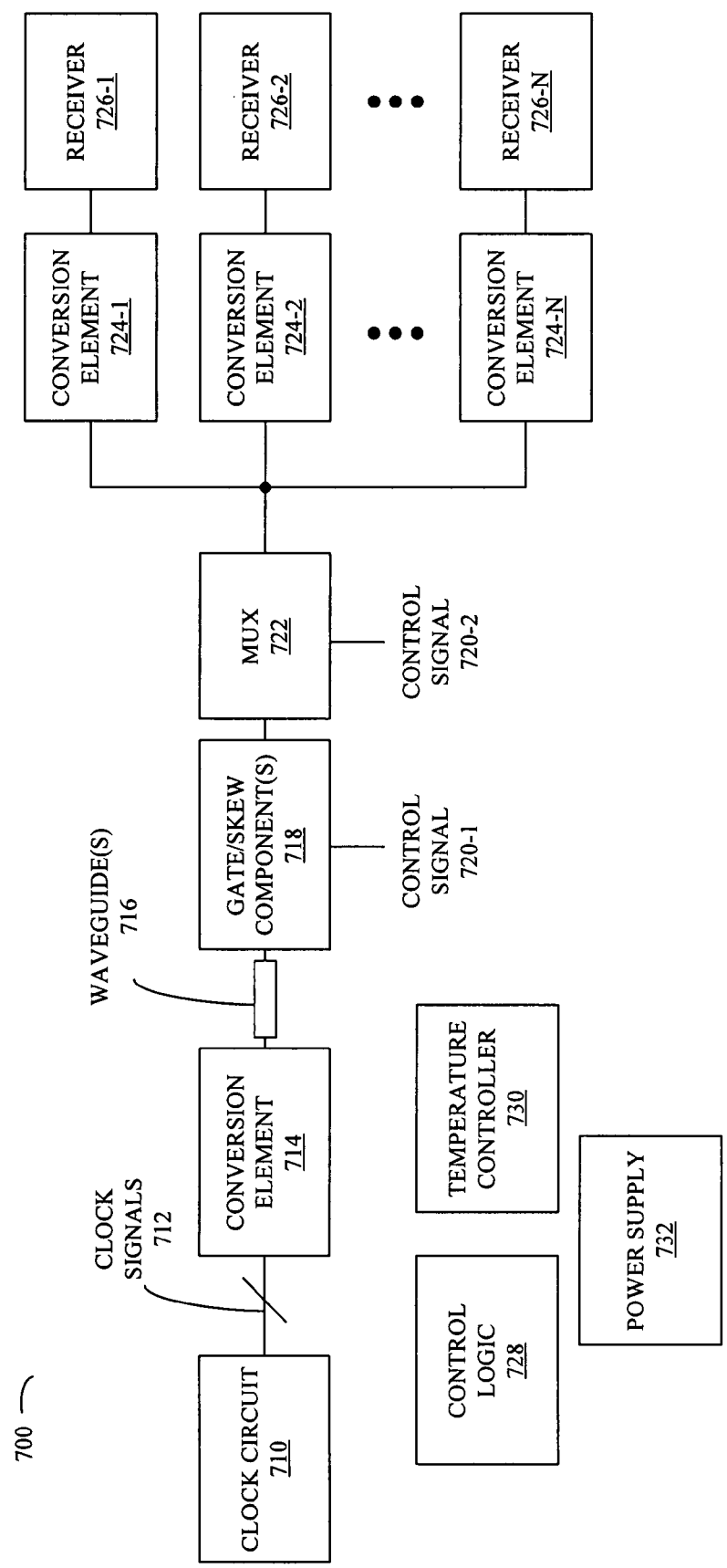
FIG. 7 is a block diagram illustrating a clock path in accordance with an embodiment of the present invention.

Photonic clocking may also be used to provide or distribute multi-phase clock signals on an integrated circuit. This is shown in FIG. 7, which presents a block diagram illustrating an embodiment of a clock path 700. In this path, a clock circuit 710 provides one or more clock signals 712 (for example, the clock circuit 710 may include a crystal reference coupled to a phase-locked loop and/or delay-locked loop). In some embodiments, these clock signals are electrical signals, while in other embodiments the clock signals 712 are optical signals.

In the embodiments where the one or more clock signals 712 are electrical signals, a conversion element 714 (such as a modulator) converts the one or more clocks signals 712 into optical signals (such as optical pulses).

In the embodiments where the one or more clock signals 712 are optical signals, the clock circuit 710 includes one or more components, including: an electro-optic modulator, a laser (such as a distributed laser), a saturable absorber, a multi-phase laser, on-chip photonics, and/or an optical source.

Note that a given optical signal in the optical signals has a given phase which is different than phases of the other optical signals. Thus, there may be two or more optical signals having phases such as those illustrated in FIGS. 3A and 3B. Furthermore, in some embodiments the conversion element 714 generates these multi-phase optical signals from fewer clock signals provided by the clock circuit 712 (for example, the conversion element 714 interpolates between one or more clock signals 712). However, in other embodiments there is a one-to-one correspondence between the clock signals 712 and the optical signals. In an exemplary embodiment, electronic-modulation techniques (such as the p-n junctions described previously) are used to generate the multiple phases by delaying optical signals on different paths relative to each other.

One or more waveguides 716 in the clock path 700 may be used to distribute the one or more optical signals to clock targets in an integrated circuit. These waveguides may include: a fiber, free space, and/or an on-chip waveguide (such as a silicon-based waveguide). Note that in some embodiments the one or more optical signals may be encoded, for example using WDM. For example, each of the optical signals may be assigned to a different carrier frequency and/or a different sub-channel in a communication channel that includes the one or more waveguides 716. Thus, in some embodiments, all of the optical signals are communicated using a single waveguide. However, note that even though the optical signals may share a single waveguide, these optical signals do not: interfere with each other via crosstalk (so long as the optical intensities are lower than the non-linear threshold in the waveguide); do not radiate energy to interfere with other circuits; and have exactly the same path length in order to minimize variations (and thus, clock skew).

As discussed previously in the context of FIGS. 5A and 5B, one or more gate/skew component(s) 718 may adjust skew values of one or more of the optical signals based on a control signal 720-1 provided by control logic 728. Note that these components may use: majority carriers, minority carriers, and/or thermal effects to slow down or speed up the optical signals. For example, the one or more gate/skew component(s) 718 may be used to correct for clock skew that occurs during an optical-to electrical or an electrical-to-optical conversion. These adjustments may be applied globally, i.e., all of the optical signals may be affected equally. However, if combined with filters, the one or more gate/skew component(s) 718 may effectively speed up or slow down individual optical signals, allowing for separate adjustments. In an exemplary embodiment, these modulators may include electrically controlled p-n junctions. Furthermore, as discussed previously in the context of FIGS. 6A and 6B, the one or more gate/skew component(s) 718 may be used to gate one or more of the optical signals.

In embodiments that include temperature-sensitive components (such as resonators or interferometers), a temperature controller 730 is used to regulate a temperature of at least a portion of the clock path 700. Furthermore, in some embodiments, the one or more gate/skew component(s) 718, control logic 728, and/or the temperature controller 730 are used in a feedback loop to adjust one or more clock skew values, for example, based on a power-supply signal provided by power supply 732.

After distribution to a given clock target, the one or more optical signals may be spatially separated using a multiplexer 722 (such as a prism and/or a diffraction grating). In some embodiments, the multiplexer 722 is electronically controlled, for example, using a control signal 720-2 provided by control logic 728. For example, light frequencies corresponding to different optical signals may be coupled or directed to different receivers 726 (in a receiver-circuit configuration corresponding to that discussed previously in the context of FIG. 4).

Note that in some embodiments the optical signals are first converted into electrical signals using conversion elements 724, while in other embodiments the optical signals are used to directly clock the receivers 726 (for example, the receivers 726 may include one or more optical latches). Furthermore, in some embodiments on-chip modulators are placed after the multiplexer 722 to adjust the clock skew or phase of the individual optical signals (and thus the individual phases of the clock signals) without using filters. Note these as well as other components in the various embodiments may be implemented on silicon substrates or on another suitable material (including another semiconductor)

In an exemplary embodiment using free-space optics, a prism may be tuned to direct the different optical signals to the different receivers 726. In another exemplary embodiment, the control signal 720-2 is used to select one of the optical signals (note that this embodiment facilitates digitally controlled clock skew or phase selection). In some embodiments, this selection occurs after the conversion elements 724

(i.e., after optical-to-electrical conversion). In this way, mismatches during the optical-to-electrical conversion (for example, mismatches associated with the conversion elements 724) may be corrected by adjusting the skew value of electrical signal after conversion and before selective coupling to the receivers 726.

As discussed previously, in some embodiments the clock circuit 710 and/or the conversion element 714 provides one or more optical signals. A wide variety of techniques may be used to generate (directly or indirectly) these multi-phased signals. One example is a mode-locked laser, such as a fiber-ring laser, that incorporates a nonlinear-optical element to achieve mode locking. In particular, the periodicity of the pulses in the optical signals is determined by the optical path length in the fiber ring along with a contribution from the nonlinear element. By using a saturable absorber device as this nonlinear element, pulse widths of hundreds of femtoseconds with low jitter are possible. Such ultra short pulse may be useful in embodiments that use WDM encoding of the optical signals.

In other embodiments, optical pulses corresponding to the one or more optical are produced using electro-absorption modulator lasers (EML). These lasers typically include three, appropriately spaced sections, including: a grating (a so-called distributed-feedback section), a gain section, and a modulator-absorber section. By controlling the optical-path length in an EML laser the periodicity of the pulses in the optical signals may be modified. Furthermore, by changing or modifying the grating in the distributed-feedback section, the wavelength of the optical signals may be adjusted, for example, in embodiments that include WDM encoding.

Furthermore, note that multiple pulses in optical signals associated with WDM encoding may be achieved by supplying synchronous control pulses to a bank of identical EML lasers having different grating couplers to match the wavelength spacing between the sub-channels. In addition, one or more of these lasers may be modified to produce the multi-phase pulses in the optical signals when a saturable-absorber stage is deployed in place of the modulator section. In particular, variable phases of the optical signals may be achieved by electrically biasing the absorber section as a function of time such that pulses are emitted slightly offset in time relative to each other.

In some embodiments, the multi-phase optical signals are generated using on-chip photonics. For example, silicon-on-insulator waveguides may guide the optical signals corresponding to the one or more clock signals 712. These waveguides may create copies of a given optical signal with a precise delay relative to the original optical signal. Because the delay mechanism relies on changing the refractive index, which corresponds to a change in the speed of light through the medium, very precise optical delay lines may be created on chip. As discussed previously, electronic-biasing of p-n junctions in different branches of one or more of the waveguides 716 facilitates controlled delaying of the optical signals relative to each another. By using a tree of Y branches, with phase shifters in each branch, multi-phase optical signals may be produced with an adjustable delay between any two of the optical signals. Thus, this technique facilitates on-chip multi-phased optical signals (and thus, multi-phased clock signals) with precise control of the individual phases, all of which are, by definition, locked in frequency.

Note that these techniques may be deployed at the top level of the clock distribution network or tree (for example, in a component such as the clock circuit 710 and/or the conversion element 714), and the optical signals may be distributed on separate waveguides 716. Alternatively, the techniques may be used at an intermediate level in the clock distribution network such that multiple instances of a Y-branch multi-phase clock distribution tree may be deployed across a chip. Note that the phases of the optical signals may be adjusted at high-speed because the modulation effect is fast. In an exemplary embodiment, the modulation exceeds 10 gigabits per second.

Figure 8:
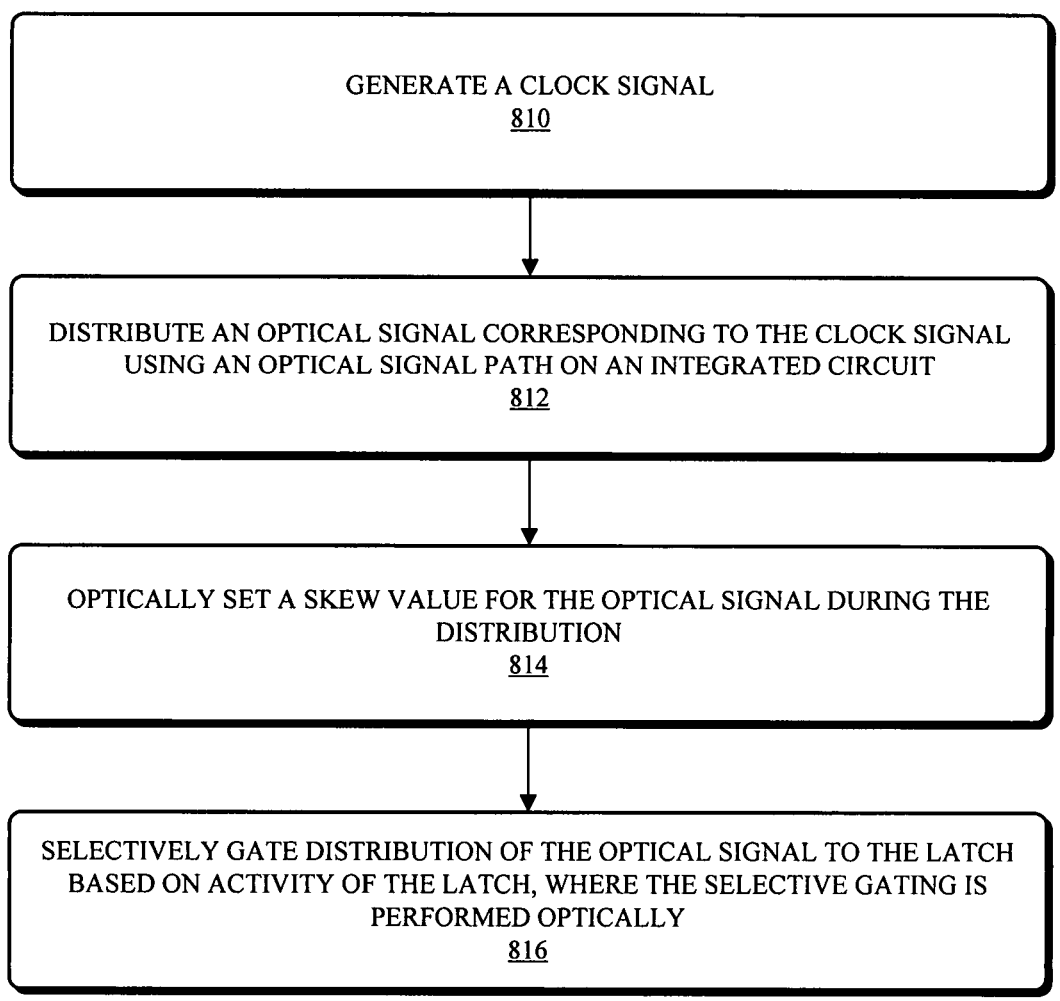
FIG. 8 is a flow chart illustrating a process for providing a clock signal in accordance with an embodiment of the present invention.

We now describe embodiments of methods for providing a clock signal on an integrated circuit. FIG. 8 presents a flow chart illustrating an embodiment of a process 800 for providing a clock signal. During this process, clock signals are generated (810). Then, an optical signal corresponding to the clock signal is distributed to a latch using an optical signal path on the integrated circuit (812). Next, a skew value for the optical signal is optically set during the distribution (814), and distribution of the optical signal to the latch is selectively gated based on activity of the latch (816). Note that the selective gating is performed optically.

Figure 9:
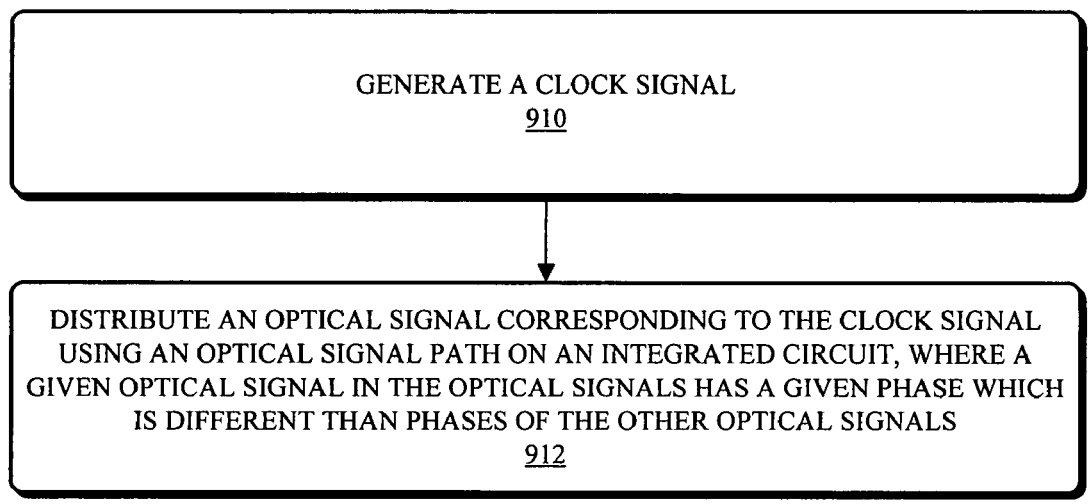
FIG. 9 is a flow chart illustrating a process for providing clock signals in accordance with an embodiment of the present invention.

FIG. 9 presents a flow chart illustrating an embodiment of a process 900 for providing clock signals. During this process, a clock signal is generated (910). Then, optical signals corresponding to the clock signal are distributed using an optical signal path on the integrated circuit (912). Note that a given optical signal in the optical signals has a given phase which is different than phases of the other optical signals.

In some embodiments of the processes 800 and/or 900 there may be additional or fewer operations, the order of the operations may be changed, and two or more operations may be combined into a single operation.

Figure 10:
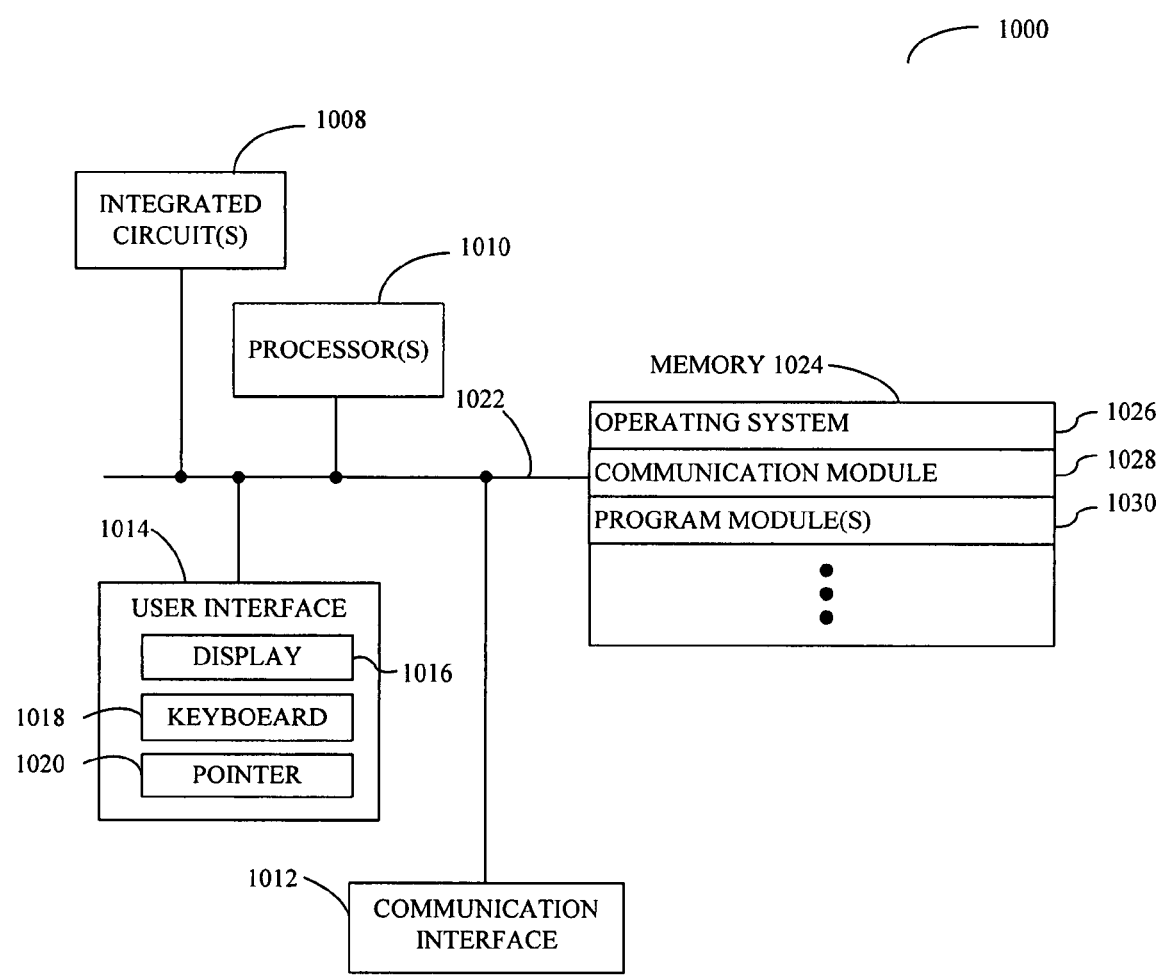
FIG. 10 is a block diagram illustrating a computer system in accordance with an embodiment of the present invention.

Note that the present invention may include systems that contain one or more integrated circuits and/or semiconductor dies such as those described previously. For example, FIG. 10 presents a block diagram illustrating an embodiment of a computer system 1000, which includes one or more processors 1010, a communication interface 1012, a user interface 1014, and one or more signal lines 1022 coupling these components together. Note that the one or more processing units 1010 may support parallel processing and/or multi-threaded operation, the communication interface 1012 may have a persistent communication connection, and the one or more signal lines 1022 may constitute a communication bus. Moreover, the user interface 1014 may include a display 1016, a keyboard 1018, and/or a pointer, such as a mouse 1020.

Computer system 1000 may include memory 1024, which may include high speed random access memory and/or non-volatile memory. More specifically, memory 1024 may include: ROM, RAM, EPROM, EEPROM, FLASH, one or more smart cards, one or more magnetic disc storage devices, and/or one or more optical storage devices. Memory 1024 may store an operating system 1026, such as SOLARIS, LINUX, UNIX, OS X, or WINDOWS, that includes procedures (or a set of instructions) for handling various basic system services for performing hardware dependent tasks. Memory 1024 may also store procedures (or a set of instructions) in a communication module 1028. The communication procedures may be used for communicating with one or more computers and/or servers, including computers and/or servers that are remotely located with respect to the computer system 1000.

Memory 1024 may also include the one or more program modules (of sets of instructions) 1030. Instructions in the program modules 1030 in the memory 1024 may be implemented in a high-level procedural language, an object-oriented programming language, and/or in an assembly or machine language. The programming language may be compiled or interpreted, i.e., configurable or configured to be executed by the one or more processing units 1010.

Computer system 1000 may include one or more integrated circuits 1008 that include on-chip photonic clocking as described in the previous embodiments. While not shown in the computer system 1000, in some embodiments the one or more integrated circuits 1008 may be coupled to one another in a macro-chip.

Computer system 1000 may include fewer components or additional components, two or more components may be combined into a single component, and/or a position of one or more components may be changed. In some embodiments, the functionality of the computer system 1000 may be implemented more in hardware and less in software, or less in hardware and more in software, as is known in the art.

Although the computer system 1000 is illustrated as having a number of discrete items, FIG. 10 is intended to be a functional description of the various features that may be present in the computer system 1000 rather than as a structural schematic of the embodiments described herein. In practice, and as recognized by those of ordinary skill in the art, the functions of the computer system 1000 may be distributed over a large number of servers or computers, with various groups of the servers or computers performing particular subsets of the functions. In some embodiments, some or all of the functionality of the computer system 1000 may be implemented in one or more application specific integrated circuits (ASICs) and/ or one or more digital signal processors (DSPs).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An integrated circuit, comprising:
    a clock-generator circuit configured to provide a clock signal; and
    an optical clock path coupled to the clock-generator circuit, wherein the optical clock path is configured to distribute optical signals corresponding to the clock signal, wherein the optical clock path is configured to optically set a skew value of one or more given optical signals by modifying at least one physical property of an optical waveguide in the optical clock path; and
    wherein a given optical signal in the optical signals has a given phase which is different than phases of the other optical signals.

2. The integrated circuit of claim 1, further comprising a receiver coupled to the optical clock path, wherein the optical signals facilitate oversampling of signals at the receiver.

3. The integrated circuit of claim 1, further comprising a group of receivers coupled to the optical clock path, wherein the optical signals facilitate oversampling of signals at the group of receivers, and wherein a given receiver in the group of receiver is configured to be triggered using one or more of the optical signals.

4. The integrated circuit of claim 3, further comprising a multiplexer between the optical clock path and the group of receivers.

5. The integrated circuit of claim 1, wherein the optical signals are encoded using wavelength-division multiplexing.

6. The integrated circuit of claim 1, wherein the skew value is non-zero.

7. The integrated circuit of claim 1, wherein while setting the skew value the optical clock path is configured to dynamically adjust the skew value.

8. The integrated circuit of claim 7, wherein the optical clock path is configured to dynamically adjust the skew value based on activity of the integrated circuit.

9. The integrated circuit of claim 7, wherein the optical clock path is configured to dynamically adjust the skew value based on a level of a power-supply signal on the integrated circuit.

10. The integrated circuit of claim 1, wherein the optical clock path includes an optical waveguide, and wherein the optical clock path is configured to set the skew value by modifying an index of refraction in the optical clock path.

11. The integrated circuit of claim 10, wherein the optical clock path is configured to electrically modify the index of refraction by changing a number of charge carriers in the optical clock path, thereby changing a delay of the optical clock path.

12. The integrated circuit of claim 10, wherein the optical clock path is configured to thermally modify the index of refraction in the optical clock path, thereby changing a delay of the optical clock path.

13. The integrated circuit of claim 1, wherein the optical clock path is configured to set the skew value by passing the optical signal through a resonant cavity that provides a known amount of additional path delay.

14. The integrated circuit of claim 1, wherein the clock generator is configured to provide multiple phases of the clock signal.

15. The integrated circuit of claim 1, wherein the optical clock path is configured to generate the optical signals from the clock signal.

16. The integrated circuit of claim 1, further comprising a conversion element coupled to the optical clock path, wherein the conversion element is configured to convert the optical signals into electrical signals.

17. The integrated circuit of claim 1, where in the optical signals are encoded using time-division multiple access, frequency-division multiple access, or code-division multiple access.

18. An integrated circuit, comprising:
    a clock-generator circuit configured to provide optical clock signals, wherein a given optical clock signal in the optical clock signals has a given phase which is different than phases of the other optical signals; and
    an optical clock path coupled to the clock-generator circuit, wherein the optical clock path is configured to distribute the optical clock signals, wherein the optical clock path is configured to optically set a skew value of one or more given optical clock signals by modifying at least one physical property of an optical waveguide in the optical clock path.

19. A method for providing multiple clock signals on an integrated circuit, comprising:
    generating a clock signal; and
    distributing optical signals corresponding to the clock signal using an optical clock path on the integrated circuit, wherein a given optical signal in the optical signals has a given phase which is different than phases of the other optical signals;
    wherein distributing the optical signals using the optical clock path involves optically setting a skew value of one or more given optical signals by modifying at least one physical property of an optical waveguide in the optical clock path.

* * * * *